Sept. 8, 1970　　　　　　　F. M. WHITE　　　　　　　3,527,446
DUAL VALVE CONTROL

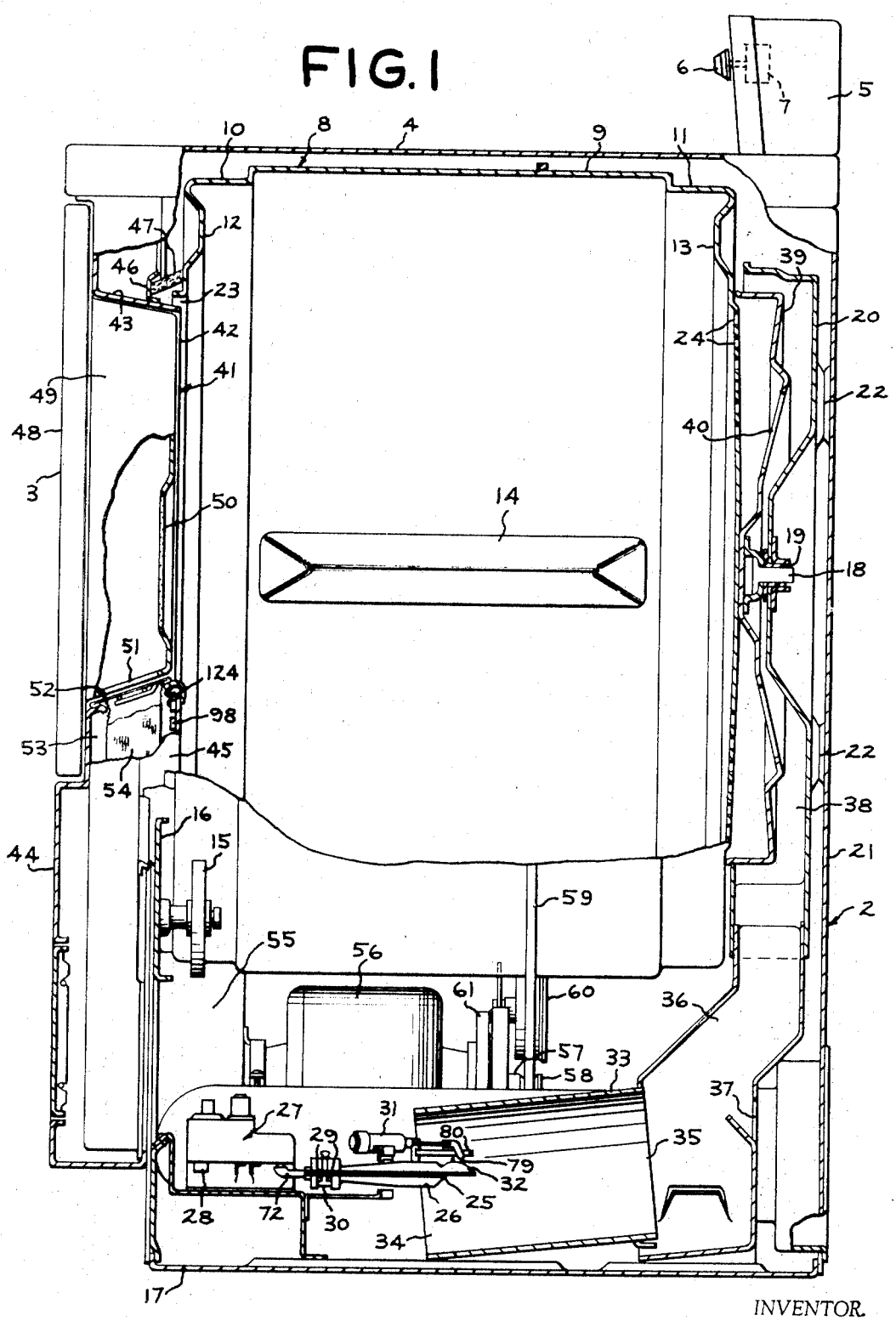

Filed Sept. 12, 1968　　　　　　　　　　　　　　　　2 Sheets-Sheet 2

INVENTOR.
FREDERICK M. WHITE
BY
HIS ATTORNEY

United States Patent Office 3,527,446
Patented Sept. 8, 1970

3,527,446
DUAL VALVE CONTROL
Frederick M. White, Louisville, Ky., assignor to General Electric Company, a corporation of New York
Filed Sept. 12, 1968, Ser. No. 759,450
Int. Cl. F27b 7/00
U.S. Cl. 263—33                     12 Claims

ABSTRACT OF THE DISCLOSURE

A fluid flow control includes two valves, one of which is bimetal actuated, arranged in series in the fluid flow path. The actuator for one valve is connected in series with a dropping resistance and the actuator for the other valve is connected to an intermediate terminal of the resistance. A shunt is initially connected across at least part of the resistance to give fast opening of the valves and then is removed to reduce the applied voltage to a lower holding value.

BACKGROUND OF THE INVENTION

In many applications of fluid flow control devices or valves, particularly gas fueled burner applications, it is desirable to provide two valves connected in series in the fluid flow path. Thus it is necessary that both valves be open before fluid will flow. Therefore closing one valve will stop the flow even if the other sticks open. Most such valve arrangements in the past have used two solenoid valves. In order to obtain variable flow control with such arrangements it is necessary either to cycle one of the valves on and off or to provide a third, rate of flow, valve.

As disclosed in my copending application Ser. No. 759,451 filed on Sept. 12, 1968, thermally operated valves, such as, for example, bimetal valves, can be constructed to provide different levels of flow, as well as on-off control. Thus it is desirable where different flow levels are needed to use a bimetal valve in place of one of the solenoid operated valves. However, one problem with such an arrangement is that bimetal valves are fairly slow opening. This presents difficulty in installations such as gas fueled dryers, which have automatic ignition systems, since it would tend to require excessive use of the igniter.

Accordingly, it is a general object of the present invention to provide an improved flow control arrangement having two serially connected valves, at least one of which is of the thermally operated type, wherein rapid opening of both valves is accomplished.

A further object of my invention is to provide such a rapid opening flow control wherein the level of energy applied to both valves is reduced once they are opened.

Another object of my invention is to provide such a control wherein one valve is solenoid operated and the other is bimetal operated, and the energy reduction for both valves after opening is obtained through the same impedance means.

SUMMARY OF THE INVENTION

In carrying out this invention in one form thereof, there is provided a fluid flow control, including two valves connected in series in the path of flow of the fluid to allow fluid flow only when both valves are open. Each valve is provided with electrically controlled operating means and is operable to its open position in response to the application of electric energy. In at least one of the valves the opening action is produced by a thermally responsive member, such as, for example, a bimetal, and the electrically controlled operating means for that valve comprises electrical heating means associated with the thermally responsive member. Circuit means are included for connecting the valves to a suitable source of electric energy, and incorporated in these circuit means are control means initially for providing the valve operating means with a high level of electric energy and, thereafter, reducing the level of electric energy. Thus, both valves are opened rapidly, the thermally responsive member openings the one valve quickly in response to a high level of initial heating from the electrical heating member, and thereafter both valves are held open at the lower energy level. By controlling the magnitude of the lower or subsequent energy level there is the availability of different flow rates from the valve having the thermally responsive actuator, and thereby my improved flow control has the advantages of both rapid opening and different flow rates, if desired.

BRIEF DESCRIPTION OF THE DRAWINGS

FIG. 1 is a side elevational view of a clothes dryer suitable for incorporation of the improved control of the present invention, the view being partly broken away and partly in section to illustrate details;

DESCRIPTION OF THE PREFERRED EMBODIMENTS

Figure 3:
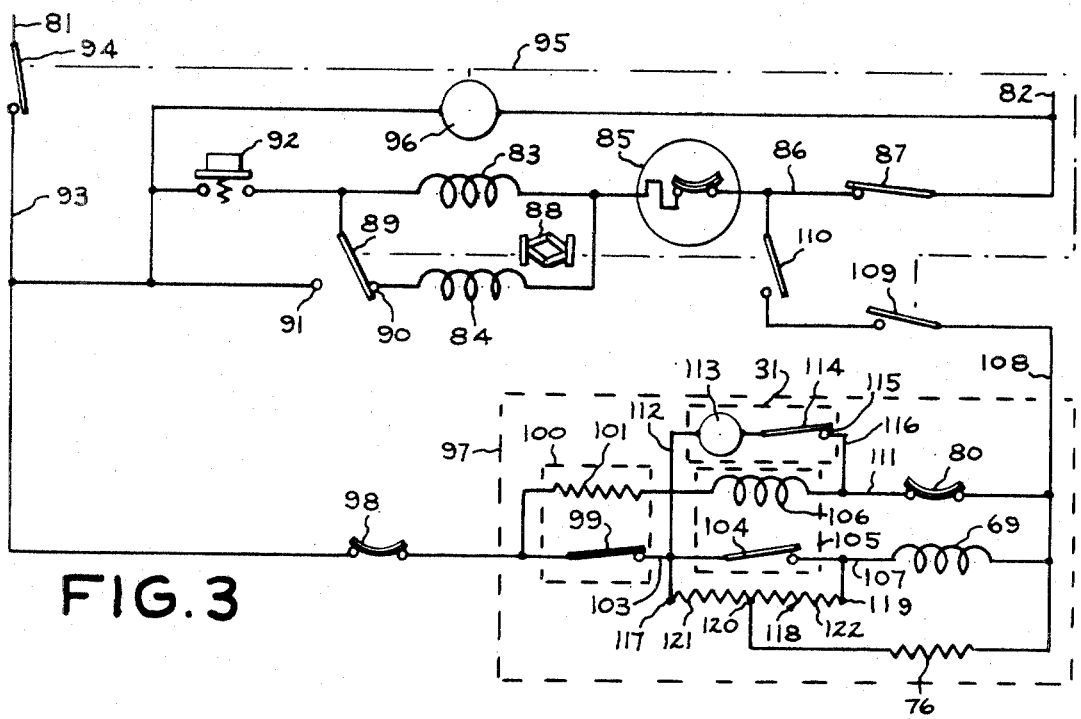
FIG. 3 is a schematic electric circuit diagram illustrating a basic control for the dryer of FIG. 1, incorporating one embodiment of the present invention.

Referring now to FIG. 1, the machine illustrated is a domestic fabric or clothes dryer including a cabinet 2 having a front door 3 to provide access to the interior of the cabinet for loading and unloading fabrics. Provided on the top 4 of cabinet 2 is a control panel 5, which may, in a conventional way, include a suitable manual control 6 connected to a control assembly 7 mounted in the panel 5. By manual setting of control 6, such machine may be caused to start and automatically proceed through a cycle of operation.

With cabinet 2, there is provided a clothes tumbling chamber or drum 8 mounted for rotation on a substantially horizontal axis. Drum 8 is substantially cylindrical in shape, having a center cylindrical wall portion 9, and outer cylindrical wall portions 10 and 11, located respectively adjacent an annular front wall 12 and a circular rear wall 13 of the drum. Wall portions 9, 10 and 11 are imperforate over their entire area so that the outer shell of the drum is imperforate. On the interior surface of wall portion 9 there are a plurality of clothes tumbling ribs 14 so that clothes are lifted up when the drum rotates, and then tumble back down to the bottom of the drum. The front of the drum 8 may be rotatably supported within outer casing 2 by suitable idler wheels, one of which is indicated by the numeral 15. These wheels are rotatably secured to the top of the member 16 which extends up from the base 17 of the machine. The wheels 15 are disposed beneath the drum, in contact with portion 10, so as to support the portion 10 on each side to provide a stable support.

The rear end of drum 8 receives its support by means of a stub shaft 18 extending from the center of wall 13. Shaft 18 is secured within a bearing 19 formed in a baffle-like structure 20 which, in turn, is rigidly secured to the back wall 21 of the cabinet 2 by any suitable means such as welding at a number of points 22. With the arrangement shown, the drum may rotate on a horizontal axis, with rollers 15 providing the front support and stub shaft 18 within bearing 19 providing the rear support.

In order to provide for the flow of a stream of drying air through the clothes drum, it is provided with a central aperture 23 defined by the wall 12 and a plurality of perforations 24 in the rear wall 13. Perforations 24 in the present case are formed to extend around the rear wall in an annulus. The air provided to the drum is heated by a gas flame which issues from the outlet 25 of a burner 26. Burner 26 receives a regulated supply of gas from a control valve assembly 27, the gas being supplied to the assembly 27 through a supply pipe or conduit (not shown) connected to the assembly inlet 28. In the conventional way, primary air is drawn into the burner through an inlet opening 29, which is controlled by a shutter 30. The primary air and gas are mixed in the burner and are ignited by means of an igniter generally indicated at 31. The gas flame is then spread out by a spreader 32 formed at the outlet end of the burner. This is located just within a combustion chamber 33 so that secondary air is drawn in through the end 34 of the chamber 33 and is heated to a high temperature.

The outlet end 35 of chamber 33 communicates with an upwardly extending duct 36, which is provided with additional air openings 37 in order to reduce the temperature of the air and gas mixture to an appropriate extent. The heated mixture (hereinafter called heated air) then flows upwardly through duct 36 and enters a generally circular heat defuser chamber 38 formed between the member 20 and a baffle 39, which is rigidly secured to the outer surface of wall 13. Baffle 39 has openings 40 formed therein so that the heated air may flow from the chamber 38 through the openings 40 and perforations 24 into the drum 8.

The front opening 23 of the drum is substantially closed by means of a stationary bulkhead generally indicated by the numeral 41. Bulkhead 41 is made up of a number of adjacent members including the inner surface 42 of the access door 3, a stationary frame 43 formed as a flange on front wall 44 of the cabinet, the inner surface of an exhaust duct formed by the cooperation of member 45 and the front wall 44 of the cabinet, and an annular flange 46 mounted on the frame 43 of front wall 44. It will be noted that a suitable clearance is provided between the inner edge of aperture 23 and the edge of bulkhead 41 so that there is no rubbing between the drum and the bulkhead during rotation of the drum. In order to prevent substantial air leakage through the aperture 23, a suitable ring seal 47 is secured to the flange 46 in sealing relationship with the exterior surface of the drum wall 12.

Central aperture 23, in addition to serving as part of the air flow passage to the drum, also serves as a means whereby clothes or other fabrics may be loaded into and unloaded from the drum. Door 3, whose inner surface forms part of the bulkhead closing the opening, is mounted on cabinet 2 so that when the door is opened fabrics may be inserted into and removed from the drum through the door frame 43. It will be noted that the door includes an outer, flat imperforate section 48 and an inwardly extending hollow section 49, mounted on the flat outer section. Hollow section 49 extends into the door frame 43 when the door is closed, and the door surface 42 which comprises part of the combination bulkhead 41 is actually the inner wall of the hollow section.

The air outlet from the drum is provided by a perforated opening 50 formed in the inner wall 42 of hollow door section 49. The bottom wall section of door 3 and the adjacent wall of door frame 43 are provided with aligned openings 51 and 52, opening 52 providing an entrance to a duct 53 formed by the cooperation of member 45 with front wall 44. A lint trap 54 may be positioned in the exhaust duct 53 an opening 52 and supported by the door frame 43. Duct 53 leads downwardly and communicates with a housing 55. Housing 55 contains a blower (not shown) which is directly driven by motor 56. The blower draws heated air through the duct 54 and then exhausts it from the cabinet 2 through an appropriate duct (not shown).

In addition to driving the blower, motor 56 constitutes the means for effecting rotation of drum 8. In order to effect this rotation, motor 56 is provided with a shaft 57 having a small pulley 58 formed at one end thereof. A belt 59 extends around the pulley 58 and also entirely around the wall section 9 of drum 8. The relative circumferences of the pulley 58 and the wall section 9 cause the drum to be driven by the motor at a speed suitable to effect tumbling of fabrics in the drum. In order to effect proper tensioning of the belt 59, a suitable idler assembly 60 is secured to the same support 61 which supports one end of the motor. Thus, air is pulled through the drum and, at the same time, the fabrics within the drum are tumbled. The air is heated by the flame emitted by the burner 26. The heated air passing through the drum causes vaporization of moisture from the clothes, and the vapor is carried off with the air as it passes out of the machine.

Figure 2:
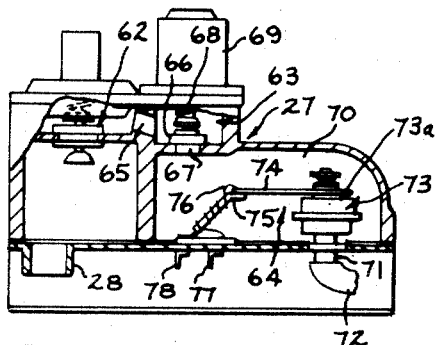
FIG. 2 is an enlarged, fragmentary side elevational view showing, in a somewhat schematic form, the flow control valve arrangement of the machine of FIG. 1, the view being partly broken away and partly in section to illustrate details.

Referring now to FIG. 2, there is shown in more detail the gas flow control valve assembly 27 for providing a regulated flow of gas into the burner 26. The flow control assembly 27 is formed and construrted so that a pressure regulator 62, a solenoid valve 63 and a bimetal valve 64 are serially arranged in the flow path for the gas. Thus for gas to flow to the burner 26 both the solenoid valve 63 and the bimetal valve 64 must be open.

In a conventional manner the regulator 62 functions to provide a relatively ccnstant pressure stream of gas regardless of variations in the pressure of the gas entering the inlet 28. From the pressure regulator, the gas flows through an opening 65 to the inlet side of the solenoid valve 63. The solenoid valve includes a plunger 66 which is biased against an opening 67 by a spring 68. An electrical operating means, comprising a solenoid coil generally indicated at 69 is positioned around the plunger 66 and, when energized, will raise the plunger against the force of the spring 68 so as to expose the opening 67 for gas flow therethrough into a chamber 70, which surrounds the bimetal valve 64. As is conventional, the solenoid valve is designed so that, when a first relatively high voltage is applied to the solenoid it will cause the plunger to lift. Thereafter, the continued application of a lower valve voltage will keep the plunger lifted. When the voltage falls below this lower or holding value the punger quickly will be forced closed by the spring 68 to shut off the flow of gas.

A suitable outlet conduit 71 is provided from the chamber 70 and is connected by a tube 72 to the inlet of the burner 26. The inlet end of the outlet conduit 71 comprises a valve 73 having a valve seat and a cooperating valve or closure member 73a. The valve member 73a is mounted on one end of an elongated support 74, preferably comprising an ambient compensating bimetal. The other end of the support 74 is mounted on a thermally responsive actuator here shown in the form of a control bimetal 75. A suitable heating wire 76 is wrapped about the control bimetal and is attached at one end to the member 74. The other end of the heater 76 is connected to a terminal 77. The control bimetal 75 is connected to a similar terminal 78. Since the support 74 and the control bimetal 75 are both conductive, an electric circuit is formed from the terminal 77 through the heater wire 76 support 74 and control bimetal 75 to the other terminal 78. Electric energy may be provided through this circuit to the heater 76 and the control bimetal 75 for causing the control bimetal to pivot and open the valve. The circuit thus comprises an electrical operating means for the control bimetal.

In this regard, heating of the control bimetal 75 causes it to pivot counterclockwise, as seen in FIG. 2, so as to move the valve member 73 off its seat to open the outlet conduit 71. In the usual manner the degree of heating of the bimetal will control the spacing of the seat 73 from the inlet end of the conduit 71 and thus control the amount of gas flowing out of the valve assembly 27 to the burner 26. A suitable bimetal actuated valve assembly providing both on-off control as well as different levels of flow according to the heating of the bimetal is described in detail and claimed in my aforementioned application Ser. No. 759,451, filed concurrently herewith. For a more detailed understanding of how the valve 73 may, in one preferred form thereof, provide different levels of flow in response to different levels of bimetal heating reference may be had to that application.

From the bimetal valve 64 gas flows through the outlet conduit 71 and tube 72 to the inlet of the gas burner 26, where it is mixed with primary air entering the burner through the opening 29. This air and gas mixture flows through the burner 26 to be ignited by the igniter 31, which is positioned over a bleed opening 79 formed in the flame spreader portion 32 of the burner (FIG. 1). A small or bleed portion of the gas and primary air mixture will flow out through the opening 79 and impinge on the contacts of the igniter so that, as a spark is formed between these contacts, the bleed mixture will be ignited. It, in turn, will ignite the main flow. Once the gas and primary air mixture is ignited a small pilot flame will flow through the bleed opening 79 to impinge upon a flame detector 80.

Referring now to FIG. 3, there is shown therein a schematic electric circuit diagram illustrating a basic or simplified control arrangement for the dryer of FIG. 1 and incorporating one embodiment of the present invention. It will be understood that many refinements such as temperature selection means, multiple cycle selection means, and fabric temperature or resistance responsive control means for automatically concluding the operation of the dryer, etc., have not been shown in the circuit of FIG. 3 for the sake of simplicity as they do not form a part of the present invention.

The control circuit includes a pair of conductors 81 and 82 adapted to be connected to a suitable source of electric energy or power. For domestic use this normally will be a 115 volt power supply. The main motor 56 of the machine is a single-phase, induction-type motor, having a main winding 83 and a start winding 84, connected at a common end through a conventional motor protector 85 to a conductor 86. The conductor 86 is connected to one side of a door switch 87, which has its other side connected to the supply conductor 82. The door switch is open when the door 3 is open and is closed when the door is closed.

The start winding 84 and the main winding 83 are connected in parallel under the control of a speed responsive device 88 which is responsive to the rotation of the rotor of the motor 56. The speed responsive device 88 controls a switch 89 which is engageable with contacts 90 and 91, being engaged with contact 90 when the machine is at rest and moving into engagement with contact 91 as the motor comes up to speed. Engagement with contact 90 connects the start winding 84 in parallel with the main winding 83, while movement of the switch 89 away from this position opens the start winding. Thus, as the motor comes up to speed the start winding is deenergized and the motor then continues to run on the main winding 83 alone.

Starting of the motor is provided by a manually operable switch 92 which, for instance, in the structure of FIG. 1 may be moved to its closed position by pulling out on the manual control 6. Switch 92 connects the motor to a conductor 93 which, in turn, is connected to the supply conductor 81 through a switch 94. Switch 92 is biased to its open position as shown; however, when the manual control 6 is pulled out, and providing switches 87 and 94 are closed, energization of the motor is provided. Within less than a second, under normal circumstances, the motor 56 comes up to speed so that switch 89 moves from contact 90 and engages contact 91. This forms a bypass around the switch 92 for the main winding 83 and the motor 56 continues to be energized when the manual control 6 is released and switch 92 opens.

As indicated by the dash line 95, the switch 94 is under the control of a timer motor 96. The timer motor may also be connected to the manual control 6 so that rotation of the manual control will cause the timer motor to rotate and thus close the switch 94 to provide power to the control circuit. The operation of the machine is terminated when the timer motor has rotated a sufficient amount to open the switch 94. It will be noted that the timer motor is connected on one side to the conductor 93 and on the other side to the conductor 82 so that it is energized any time the switch 94 is closed.

The control of the gas flow to the burner 26 and its ignition is accomplished by flow control arrangement generally indicated at 97. The control circuit for flow control arrangement 97 proceeds from the conductor 93 to a conventional thermostat 98, which normally is closed and opens in response to predetermined high temperature. The thermostat 98 then recloses when the temperature it senses reaches a relatively low level. As shown in FIG. 1, the thermostat 98 is placed in duct 53 so that it senses and responds to the temperature of the air leaving the machine. This air temperature is responsive to the temperature of the fabrics being dried.

From the thermostat 98 one branch circuit extends through the bimetal switch arm 99 of a warp switch 100, which has a bimetal heater 101, to a conductor 103. The conductor 103 is connected to the switch 104 of a relay 105, which has an actuating coil 106. The other side of the switch 104 is connected by a conductor 107 to one side of the coil 69 for the solenoid 63. The other side of the coil 69 is connected by a conductor 108 to a switch 109, which also is controlled by the timer motor 96. The switch 109 is connected to the conductor 86 through a switch 110, which is controlled by the speed responsive device 88 so that the switch 110 is closed only when the motor 56 is rotating at operational speed.

Figure 5:
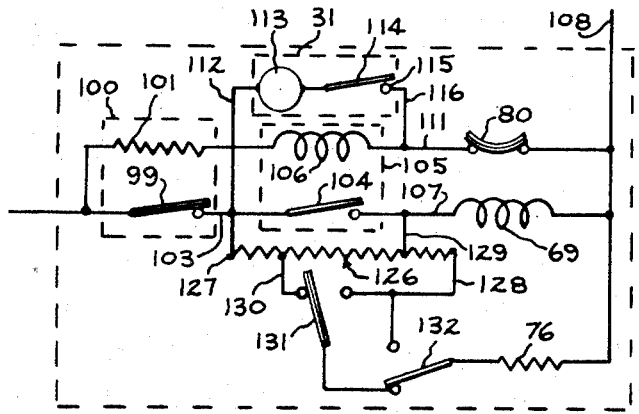
FIG. 5 is a schematic electric circuit diagram showing still another modified form of the valve control portion of the control of FIG. 3.
Figure 4:
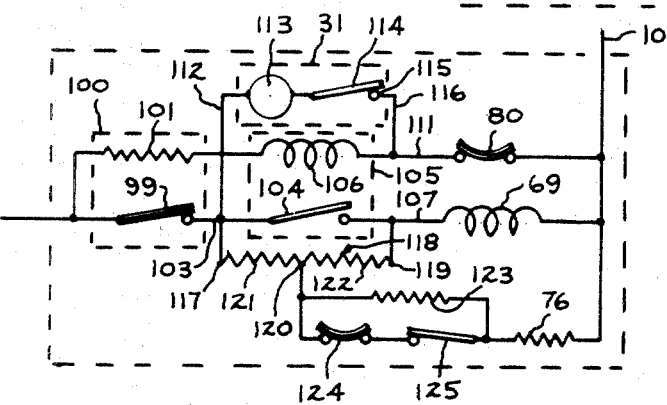
FIG. 4 is a schematic electric circuit diagram showing a modified form of the valve control portion of the control of FIG. 3.

From the thermostat 98 another branch circuit extends through the heater 101 of the warp switch, the coil 106 of the relay 105, a conductor 111, and the flame sensor 80 to the conductor 108. As explained above, the flame sensor 80 is positioned to sense the ignition of the gas and air mixture being emitted by the burner 26. The flame sensor is normally closed, as illustrated in FIGS. 3 through 5, so that current flows through the heater 101 and coil 106. However, upon ignition of the air and gas mixture, the flame sensor quickly opens to de-energize these two elements. The bimetal arm 99 of the warp switch is normally closed, as shown; however, after a predetermined period of heating caused by current flow through the heater 101, it will open to de-energize the circuit. This period is designed to be substantially longer than ignition normally takes so that the warp switch serves as a safety device to turn off the flow of gas in the event of a malfunction preventing ignition.

From conductor 103 another branch circuit extends through a conductor 112 to the motor 113 and then the contacts 114 and 115 of the igniter 31. A conductor 116 connects the contact 115 to conductor 111. With this branch circuit, so long as the warp switch arm 99 is closed and the flame sensor 80 is closed, the igniter will be energized. The contacts 114 and 115 are biased closed and the motor 113 opens them. Since there is current flow through the contacts at this time, a spark is emitted. The opening of the contacts also de-energizes the motor 113 so that the contacts are returned to their closed position.

This process is repeated to provide sparks at the burner 26 until the gas and air mixture is ignited to open the flame sensor 80, or until the bimetal arm 99 of the warp switch opens.

One end terminal 117 of a dropping resistance 118 is connected to the conductor 103 while the other end terminal 119 of the dropping resistance is connected to the conductor 107. Thus the dropping resistance is connected in parallel with the switch arm 104 of the relay 105. Intermediate terminal 120 of the dropping resistance is connected to one end of the heater 76 for the control bimetal of the bimetal valve 64. The other side of the heater 76 is connected to the conductor 108. The intermediate terminal 120 divides the dropping resistance into two sections. The first of these 121 extends from the end terminal 117 to the intermediate terminal 120 while the other section 122 extends from the intermediate terminal 120 to the end terminal 119.

The switch 104 is normally open and is moved to its closed position by current flow through the coil 106. Thus, at the beginning of operation of the dryer, that is until flame sensor 80 has opened to inactivate the coil 106, the switch 104 will be closed. When the switch 104 is closed it effectively forms a shut or a bypass between the end terminals 117 and 119 of the dropping resistance. This effectively shorts out the dropping resistance from the circuit for the coil 69 of the solenoid valve 63 and places the two sections 121 and 122 of the dropping resistance in parallel in the circuit for the heater 76 of the bimetal valve 64. Then, when the flame sensor opens in response to ignition of the air and gas mixture, the switch 104 will open. With switch 104 open, the circuit for the coil 69 is through both sections of the dropping resistance 118 in series and the circuit for the heater 76 is through the section 121 of the dropping resistance. Thus, initially a high voltage is placed on the coil 69 to pick up the plunger 66 for opening the solenoid valve 63 and a minimum dropping resistance is connected in series with the bimetal heater 76 so that its heating effect will be greater and the bimetal valve 64 will quickly open. Then, upon ignition of the air and gas mixture, a large resistance is placed in series with the solenoid coil 69 to drop the voltage applied to it to a lower holding value and greater resistance is placed in series with the bimetal heater so that its heating is reduced and it can be more effectively controlled.

For a typical cycle of operation the user would open the door 3, load the fabrics desired to be dried in the drum 8, then close the door 3, which closes switch 87. The user then would rotate the manual control 6, which rotates the timer 96 to close the switches 94 and 109. Then, the user would pull out on the manual control 6, closing the switch 92. Initially the main motor 56 will start on both the main winding 83 and the start winding 84. When the motor comes up to speed, the speed responsive device 88 moves the switch arm 89 from contact 90 to contact 91 to disconnect the start winding 84 and to form a connection around switch 92 so that the motor continues to operate on the main winding alone when the manual control 6 is released, opening switch 92.

Until the main motor 56 comes up to speed there can be no gas provided to the machine because switch 110 must be closed by the speed responsive device to complete the circuit for the control arrangement. Once the switch 110 is closed, a circuit is completed through the thermostat 98, switch arm 99, switch 104, and conductor 107 to coil 69. From coil 69 the circuit extends through the conductor 108, switch 109, switch 110, conductor 86 and the door switch 87 back to the supply conductor 82. Thus, the coil 69 will be energized to move the plunger 66 against the force of the spring 68 so that gas may flow through the opening 67.

At the same time a circuit is formed from the conductor 103 through the end terminal 117 and dropping resistance section 121 to the intermediate terminal 120 and from the conductor 103 through the switch 104, end terminal 119 and dropping resistance section 122 to the intermediate terminal 120. From intermediate terminal 120 the circuit extends through the bimetal heater 76 to the conductor 108. Thus, the bimetal heater 76 is energized with a minimum dropping resistance connected in series with it (resistor sections 121 and 122 being in parallel) so that its heating effect is greater than normal and the bimetal switch 64 quickly opens, allowing gas to flow from the chamber 70 through the outlet conduit 71 and tube 72 to the burner 26.

The gas is mixed with primary air in the burner 26 and this gas and air mixture flows from the end to the burner. The circuit for the igniter 31 is completed from the conductor 103 through the conductor 112, motor 113, contacts 114 and 115, and conductor 116 to the conductor 111. From conductor 111 it extends through the flame sensor 80 to a conductor 108. The igniter causes a repeating spark to occur at the bleed opening 79, which will ignite the air and gas mixture.

Until ignition occurs a circuit is complete from the thermostat 98 through the warp switch heater 101 and coil 106 of the relay 105 to the flame sensor 80, causing the relay switch 104 to be closed and the bimetal switch arm 99 to be heated. Once the igniter has caused the air and gas mixture to ignite, the flame sensor 80 quickly opens. This de-energizes the igniter, the heater 101 and the coil 106. De-energization of the coil 106 causes the switch 104 to open so that the circuit for the solenoid coil 69 now extends from the conductor 103 through the dropping resistance 118 to the coil 69. Solenoid valves normally require a relatively large voltage to be applied to a coil in order to initially overcome the biasing spring and open the valve. However, once the valve is open, a lower voltage will effectively hold it open and such lower voltage reduces the heating effect on the valve. By use of the dropping resistance 118 and the switch 104 such an operation is provided. The energizing circuit for the bimetal heater 76 now extends from the conductor through the end terminal 117 and dropping resistance section 121 to the intermediate terminal 120 and then to the heater. Thus, the effective resistance connected in series with the heater 76 has been increased. The resultant heating of the bimetal 75 is thus reduced from the initial high level for causing quick opening of the valve 73 to a lower level appropriate for maintaining the valve open.

The dryer continues in operation with the flame from the burner heating the air drawin through the dryer to evaporate the moisture from the fabrics. When the upper operating temperature is reached thermostat 98 will open. This de-energizes the valve control circuit and the valves 63 and 64 close to shut off the gas supply. The temperature in the machine begins to fall and when it reaches the reset level, thermostat recloses and re-energizes the valve control circuit. The valves 63 and 64 are reopened, as explained above, and the gas is reignited to once again provide heat. This operation continues to provide an average temperature in the machine which is designed to effectively dry the fabrics without overheating them. After a predetermined period of drying the timer motor 96 causes the switch 109 to open. This completely de-energizes the flow control apparatus, then the heat to the dryer is stopped.

The main motor continues to run for a relatively brief period of time thereafter so that the fabrics are tumbled while a stream of cool air is drawn through the dryer to reduce the temperature of the fabrics to a comfortable handling level. Then the timer motor causes switch 94 to open, completely de-energizing the control circuit and turning off the machine.

FIG. 4 shows a modified flow control and ignition circuit and in the discussion of this circuit like elements will be given like numbers. The difference between the circuit illustrated in FIG. 4 and that one described in FIG. 3 resides in the connection between the intermediate terminal 120 of the dropping resistance 118 and the bimetal heater 76. In FIG. 4 a parallel circuit is provided. One arm includes an auxiliary dropping resistance 123 and the other arm includes a series connection of a temperature responsive switch such as a bimetal 124 and a manual switch 125. The bimetal 124 is placed within the machine so as to sense and be responsive to a temperature which is representative of the temperature of the fabrics being dried. To this end one suitable place for such a switch is in the outlet duct 53, as shown in FIG. 1. With this arrangement the air flowing from the machine impinges on the bimetal and, since this air is representative of the temperature of the fabrics being dried, the bimetal is responsive to the fabric temperature. Thermostat 124 is designed to have an opening temperature and a reclosing temperature which are lower than the thermostat 98.

Manual switch 125 may be opened and closed by use of a suitable element in the backsplasher and would normally be opened for a low heat operation and closed for a high heat operation. When the manual switch is open the energizing circuit for the bimetal heater 76 always includes the auxiliary dropping resistance 123 so that the heating effect of heater 76 is less and the bimetal valve 73 does not fully open. This reduces the rate of gas flow and a lower level of heat is provided. On the other hand, for an initial high heat drying operation the manual switch is closed. Then the circuit for the heater 76 initially is from intermediate terminal 120 through the bimetal 124 and manual switch 125 to the heater 76, until the fabrics being dried reach a predetermined temperature causing the bimetal 124 to open. Then the circuit extends through the auxiliary dropping resistance 123 and the heating effect of the bimetal heater 76 is reduced so that the bimetal valve 64 partially closes and the heat provided to the dryer is reduced. This is effective to provide initial high heat energy in the load until the fabrics reach the effective drying temperature range. This reduces the overall drying time for large loads, which require a great deal of heat to bring them to the effective drying range.

The circuit diagram of FIG. 5 illustrates another modification of the gas flow control circuit of FIG. 3 and again the same numerals will be used to identify the elements. The circuit of FIG. 5 shows yet another modification of the dropping resistance and its connection in the control circuit. As shown therein a dropping resistance generally indicated at 126 includes a first end terminal 127 connected to the conductor 103 and a second end terminal 128. A first intermediate terminal 129 is connected to the conductor 107 and a second intermediate terminal 130 is provided between the first end terminal 127 and the first intermediate terminal 129. The relay switch 104, being connected between the conductors 103 and 107 is effectively connected between the end terminal 127 and the intermediate terminal 129. A temperature responsive switch such as a bimetal switch 131 is provided and may be mounted in a fashion similar to switch 124 to sense internal dryer temperature. Rather than being opened or closed like switch 124, it moves between the intermediate terminal 130 and the end terminal 128 in response to the sensed temperature. A manual switch 132 is provided similar to the switch 125 of FIG. 4 and is movable between the bimetal 131, for a high temperature drying cycle, controlled by the temperature of the fabrics being dried and end terminal 128 for low heat drying.

Assuming the setting is for a high temperature operation the bimetal 131 and switch 132 would be as shown. Initially, until the gas is ignited, the relay switch 104 would be closed. As with FIG. 3 this effectively shunts the dropping resistance 126 from the energizing circuit for the solenoid coil 69 so that the solenoid valve quickly opens. One branch of the circuit for the bimetal heater 76 extends from conductor 103 through the end terminal 127 to the intermediate terminal 130. The other branch of the energizing circuit for the bimetal heater extends from conductor 103 through switch 104, intermediate terminal 129 to intermediate terminal 130. From intermediate terminal 130 the circuit extends through the bimetal switch 131 and manual switch 132 to the heater 76. Thus two portions of the dropping resistance 126 are connected in parallel to provide an extremely low resistance in series with the heater 76 and the heater quickly causes the bimetal valve to open.

During heated drying operations the bimetal switch 131 stays in the position shown until the fabrics reach an effective drying temperature, at which time it snaps to a connection with end terminal 128. It then stays in this position with a lower input to the dryer. This is because its reset temperature, at which it will return to terminal 130, is lower than the reset temperature of thermostat 98. Once the temperature of the fabrics reaches an effective dry level the lower heat input will keep it there and the temperature does not fall to the reset level for switch 131. Thus, initially only the section of dropping resistor from end terminal 127 to intermediate terminal 130 is connected in series with the heater 76 and the heater 76 has a high heat output to cause the valve 64 to open completely. Then, when bimetal switch 131 is connected to end terminal 128, all of the dropping resistance from end terminal 127 to end terminal 128 is connected in series with the bimetal heater 76 and its heating effect drops so that the bimetal valve 64 partially closes and less heat is supplied to the dryer.

Once the switch 104 opens, the section of dropping resistance 126 from end terminal 127 to intermediate terminal 129 is continuously connected in series with the solenoid coil 69 to drop the voltage impressed on the coil to an effective holding level.

If it is desired to provide a lower heat drying cycle, the manual switch 132 is connected to the end terminal 128. With such a setting, regardless of the position of the bimetal switch 131, the energization for the bimetal heater 76 will always be the same following the opening of switch 104. At the beginning of the operation, that is, when relay switch 104 is closed, the energizing circuit for the bimetal heater will be from conductor 103 to switch 104 and intermediate terminal 129 to the dropping resistance, and then from the dropping resistance through the end terminal 128 and manual switch 132 to the heater 76. Thus a minimum resistance is placed in series with the heater and it quickly causes the bimetal valve 64 to open. Once the flame sensor 80 has opened, the circuit for the heater 76 will always extend from the conductor 103 through the end terminal 127 to the dropping resistance 126, and then from the other end terminal 128 through the manual switch 132 to the heater 76. Thus maximum resistance is placed in series with the heater 76 and the heater will provide a low level of heat under the control of thermostat 98. This will cause the bimetal valve to open only partially and provide a low gas flow and a low level of heat to the dryer.

While in accordance with the patent statutes, there have been described what at present are considered to be the preferred embodiments of the invention, it will be obvious to those skilled in the art that various changes and modifications may be made therein without departing from the invention. It is applicant's intention in the appended claims to cover all such variations as come within the true spirit and scope of the invention.

What is claimed as new and desired to be secured by Letters Patent of the United States is:
1. A fluid flow control, including:
 (a) two valves connected in series in the path of flow of the fluid for allowing fluid to flow only when both valves are open,
 (b) electrically controlled operating means for opening said valves,
 (c) at least one of said valves having a thermally responsive actuator and said operating means for said one valve comprising electric heating means associated with said actuator, and
(d) a circuit for connecting said operating means to a suitable source of electric energy;
(e) said circuit including control means initially for providing said operating means with a high level of electric energy to effect a rapid initiation of fluid flow and thereafter reducing the level of electric energy provided to said operating means.

2. The invention as set forth in claim 1 wherein:
(a) said circuit includes a dropping resistance having a pair of end terminals and an intermediate terminal;
(b) said operating means for one of said valves being connected in said circuit through said intermediate terminal;
(c) said operating means for the other of said valves being connected in said circuit in series with said end terminals;
(d) said circuit further including switch means connected in parallel with at least a portion of said dropping resistance to shunt said portion when said switch means is closed;
(e) whereby the effective electric energy provided to said valve operating means is varied.

3. The invention as set forth in claim 2 wherein said switch means is connected between said end terminals so that, when said switch means is closed, said dropping resistance is shunted from the circuit for the operating means of said other valve and the portions of said dropping resistance from said intermediate terminal to each of said end terminals are connected in parallel in the circuit for the operating means of said one valve.

4. The invention as set forth in claim 2 wherein said switch means is connected between said intermediate terminal and the end terminal remote from said valves so that, when said switch means is closed, only the portion of said dropping resistance between said intermediate terminal and the other end of said end terminals is connected in the circuit for the operating means of said other valve and said dropping resistance is shunted from the circuit for the operating means of said one valve.

5. A gas flow control arrangement for regulating the flow of gas to a burner comprising:
(a) two valves connected in series in the path of flow of the gas to the burner for allowing gas to flow to the burner only when both valves are open;
(b) electrically controlled operating means for opening said valves;
(c) at least one of said valves having a thermally responsive actuator, and said operating means for said one valve comprising electric heating means associated with said actuator, and
(d) a circuit for connecting said valve operating means to a suitable source of electric energy;
(e) said circuit including control means for initially providing said valve operating means a high level of electric energy to effect a rapid initiation of gas flow and thereafter reducing the level of electric energy provided to said valve operating means; and
(f) said control means further including means for selectively supplying at least two different levels of energization to said electric heating means following the initiation of fluid flow through said valves, thereby to obtain at least two different rates of gas flow to said burner.

6. The invention of claim 5 wherein said control means includes first and second switch means and impedance means connected in circuit with said valve operating means, said first switch means being connected to said operating means of both valves for reducing the level of energy supplied thereto after the initiation of gas flow through said valves, and said second switch means being connected to said operating means of said one valve only to provide selective energization of said electrical heating means at different levels following the operation of said first switch, whereby at least two different rates of fluid flow through said valve may be obtained.

7. For use with a fabric drying machine including a revolvable drum to receive fabrics to be dried; means for causing a stream of drying air to pass through the drum, and a gas fueled burner for heating the air provided to the drum; a gas flow control arrangement for regulating the flow of gas to the burner, including:
(a) two valves connected in series in the path of flow of the gas to the burner for allowing gas to flow to the burner only when both valves are open;
(b) one of said valves being a normally closed solenoid valve and including a coil for causing that valve to open when connected to a source of electric energy;
(c) the other of said valves being a normally closed bimetal valve and including heating means for causing that valve to open when connected to a source of electric energy;
(d) a circuit for connecting said coil and said heating means to a suitable source of electric energy;
(e) said circuit including control means for initially providing a high level of electric energy to said coil and said heating means to effect a fast opening of said valves and thereafter reducing the level of electric energy.

8. The invention as set forth in claim 7 wherein:
(a) said circuit includes a dropping resistance having a pair of end terminals and an intermediate terminal;
(b) one of said coil and said heating means being connected in said circuit in series with said end terminals;
(c) the other of said coil and said heating means being connected in said circuit through said intermediate terminal;
(d) said circuit further including a switch connected in parallel with at least a portion of said dropping resistance;
(e) said switch being controlled by a flame sensor positioned to sense ignition of the gas at the burner;
(f) said sensor causing said switch to be closed to complete a shunt across at least said portion of said resistance until the gas is ignited and thereafter causing said switch to open to remove the shunt.

9. The invention as set forth in claim 8 wherein:
(a) said coil is connected in series with said end terminals and said heating means is connected to said intermediate terminals; and
(b) said switch is connected between said end terminals so that, when said switch is closed, said dropping resistance is shunted from the circuit for said coil and the portions of said dropping resistance from said intermediate terminal to each of said end terminals are connected in parallel in the circuit for said heating means.

10. The invention as set forth in claim 9 wherein:
(a) said heating means is connected to said intermediate terminal through a sub-circuit;
(b) said sub-circuit including an auxiliary resistance connected in series with said heating means;
(c) said sub-circuit further including the series connection of a temperature responsive switch and a manual switch, said series connection being connected in parallel with said auxiliary resistance;
(d) said temperature responsive switch being positioned to sense a temperature responsive to the fabrics being dried;
(e) said temperature responsive switch being closed when the sensed temperature is below a predetermined level and opening in response to the sensed temperature reaching said predetermined level;
(f) whereby said auxiliary resistance is effectively connected in series with said heating means in response to the temperature of the fabrics being dried reaching a predetermined level only when said manual switch is closed.

11. The invention as set forth in claim 8 wherein:
(a) said heating means is connected in series with said end terminals and said coil is connected to said intermediate terminal;
(b) said switch is connected between said intermediate terminal and the end terminal remote from said coil and said heating means so that, when said switch is closed, only the portion of said dropping resistance between said intermediate terminal and the other of said end terminal is connected in the circuit for said heating means and said dropping resistance is shunted from the circuit for said coil.

12. The invention as set forth in claim 7 wherein:
(a) said circuit includes a dropping resistance having a first end terminal for connection to a suitable source of electric energy, a second end terminal, a first intermediate terminal and a second intermediate terminal between said first end terminal and said first intermediate terminal;
(b) said coil is connected to said first intermediate terminal;
(c) a temperature responsive switch is positioned to sense a temperature responsive to the fabrics being dried, said temperature responsive switch is connected in said circuit to engage said second intermediate terminal when the sensed temperature is below a predetermined level and to engage said second end terminal when the sensed temperature reaches the predetermined level;
(d) a manual switch is connected in said circuit selectively to be connected to said second intermediate terminal and to said temperature responsive switch;
(e) said heating means being connected in said circuit through said manual switch;
(f) said circuit further including a control switch connected between said first end terminal and said first intermediate terminal;
(g) said control switch being controlled by a flame sensor positioned to sense ignition of the gas at the burner, said sensor causing said control switch to be closed until the gas is ignited and, thereafter, causing said control switch to open;
(h) whereby a high level of electric energy initially is provided said coil and said heating means and the level of electric energy is reduced upon ignition of the gas; the reduced level of energy provided said heating means being controlled by said temperature responsive switch and said manual switch at least until the fabrics reach a predetermined temperature.

References Cited
UNITED STATES PATENTS 3,317,136   5/1967   Stang et al. _____ 251—130 X JOHN J. CAMBY, Primary Examiner U.S. Cl. X.R.

236—1; 251—130

UNITED STATES PATENT OFFICE
CERTIFICATE OF CORRECTION

Patent No. 3,527,446   Dated September 8, 1970

Inventor(s) Frederick M. White

It is certified that error appears in the above-identified patent and that said Letters Patent are hereby corrected as shown below:

Column 11, line 39
  delete the first occurrence of the word "end".

SIGNED AND
SEALED
DEC 15 1970

(SEAL)
Attest:

Edward M. Fletcher, Jr.
Attesting Officer

WILLIAM E. SCHUYLER, JR.
Commissioner of Patents